Jan. 20, 1970    B. B. GONZÁLEZ    3,490,216
RECEPTACLE FOR GATHERING FALLEN FRUIT
Filed Sept. 22, 1967    2 Sheets-Sheet 1

INVENTOR.
BARTOLOMÉ BAUZÁ GONZÁLEZ,
BY
Berman, Davidson & Berman
ATTORNEYS.

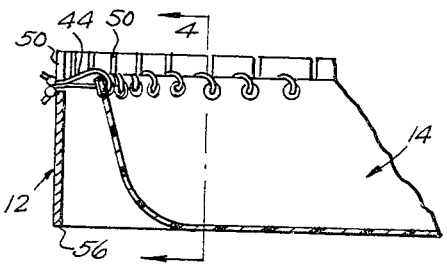
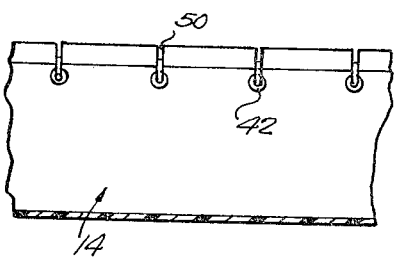
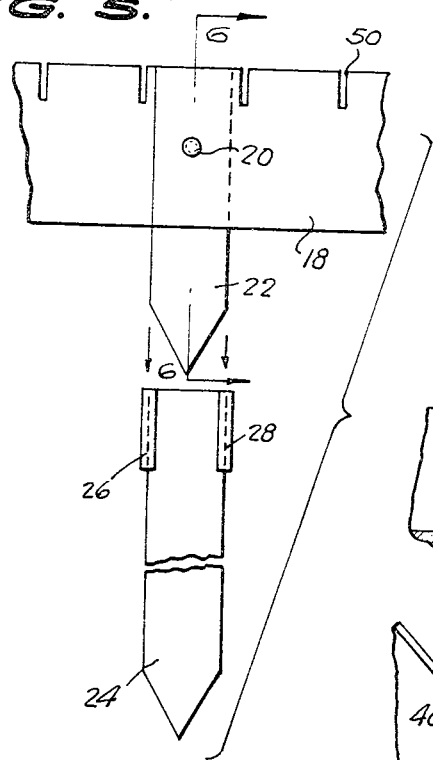
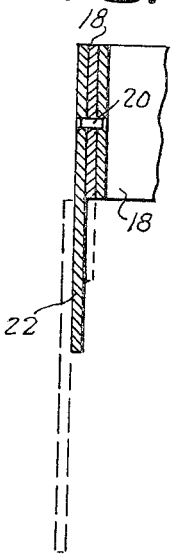
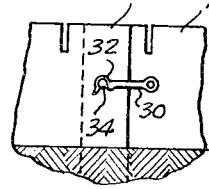
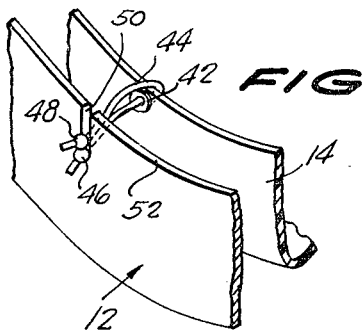
INVENTOR.
BARTOLOMÉ BAUZÁ GONZÁLEZ, United States Patent Office 3,490,216
Patented Jan. 20, 1970

3,490,216
RECEPTACLE FOR GATHERING FALLEN FRUIT
Bartolomé Bauzá González, San Juan, Puerto Rico (Calle Bellavista 318 (altos), Box 7722, Bo. Obrero Sta., Santurce, Puerto Rico 00916)
Filed Sept. 22, 1967, Ser. No. 669,850
Int. Cl. A01g 19/06
U.S. Cl. 56—329                        12 Claims

ABSTRACT OF THE DISCLOSURE

A receptacle for catching harvested fruit, positionable about a fruit bearing shrub. The receptacle includes a collapsible, circular frame, consisting of a wall formed from upright arcuate segments pivotably connected at their ends. The wall is anchored to the ground in surrounding relation to a shrub, by stakes riveted to its segments. Vertical slots are formed in the segments of the wall which open in their top edges. A fruit gathering net provided with flexible fastening elements projecting from its periphery, is secured to the frame filling the interior thereof. The fasteners have knotted ends, and are inserted in the slots in the wall; the knots maintaining the fasteners in the slots. Stake extensions, telescopically received on the anchor stakes, can be used to level the frame on sloping terrain.

The net is hung from the wall so that a major portion thereof lies in the plane of the bottom edge of the frame wall. The net will thus rest on the support surface, so that a fruit picker can stand on the net and remove the fruit from the shrub, allowing it to fall on the net. The net can then be removed from the frame and its contents stored.

---

This invention relates to a receptacle, and more particularly, a receptacle for use in catching harvested fruit or the like adapted to be positioned in surrounding relation to a fruit bearing tree or shrub.

It is an object of this invention to provide a fruit harvesting receptacle of the character indicated, which enables a fruit picker to stand in the receptacle and drop harvested fruit about him, thereby eliminating the need of the picker to constantly empty and refill individual baskets with the picked fruit.

It is another object of this invention to provide a fruit harvesting receptacle of the character indicated, which may be quickly disassembled and folded for storage, but which can be assembled for use in a matter of minutes.

Another object of this invention is to provide a receptacle of the character indicated, which can be levelled regardless of the terrain on which it is used.

These objects are accomplished by providing a frame and a gathering net, secured to the frame about the tree or shrub. The frame is formed from arcuate segments, pivotably connected at their ends so the frame can be collapsed, but when unfolded, form an upright circular wall which can be positioned about a fruit-bearing shrub or tree. Vertical slots are formed in the wall, opening in the top edge thereof. The net has flexible fastening elements knotted at their ends and projecting from the periphery of the net. The fasteners are inserted into the slots on the frame wall and the knots prevent them from being pulled through. The unfolding of the arcuate wall segments and attachment of the net can be accomplished in minutes.

The wall is provided with fixed stakes for anchoring the receptacle assembly in a support surface. Should the surface be uneven, stake extensions are furnished, which are telescopically receivable on the fixed stakes.

The major portion of the net is hung from the circular wall so that it lies in the plane of the bottom edge of the wall and thus rests on the support surface. This enables a fruit picker to stand on the net and drop or cut fruit from the tree about him. The net can then be removed from the frame and the fruit collected.

Further objects and advantages of the invention will become apparent from the following description and claims, and from the accompanying drawings, wherein:

FIGURE 3 is a cross-sectional view taken substantially along the plane indicated by line 3—3 of FIGURE 1;

FIGURE 4 is a cross-sectional view taken substantially along the plane indicated by line 4—4 of FIGURE 3;

FIGURE 5 is an exploded, fragmentary, side view in elevation of a portion of the receptacle frame wall, illustrating the manner of attaching an anchoring stake extension to the frame;

FIGURE 6 is a cross-sectional view taken substantially along the plane indicated by line 6—6 of FIGURE 5;

FIGURE 7 is a fragmentary, side view in elevation of a portion of the receptacle frame wall, illustrating the latch used to secure together the end segments of the wall;

FIGURE 8 is an enlarged, fragmentary, perspective view of the receptacle shown in FIGURE 1, illustrating the manner of fastening the gathering net to the frame wall; and FIGURE 9 is a top plan view of the fastening element shown in FIGURE 8.

Figure 1:
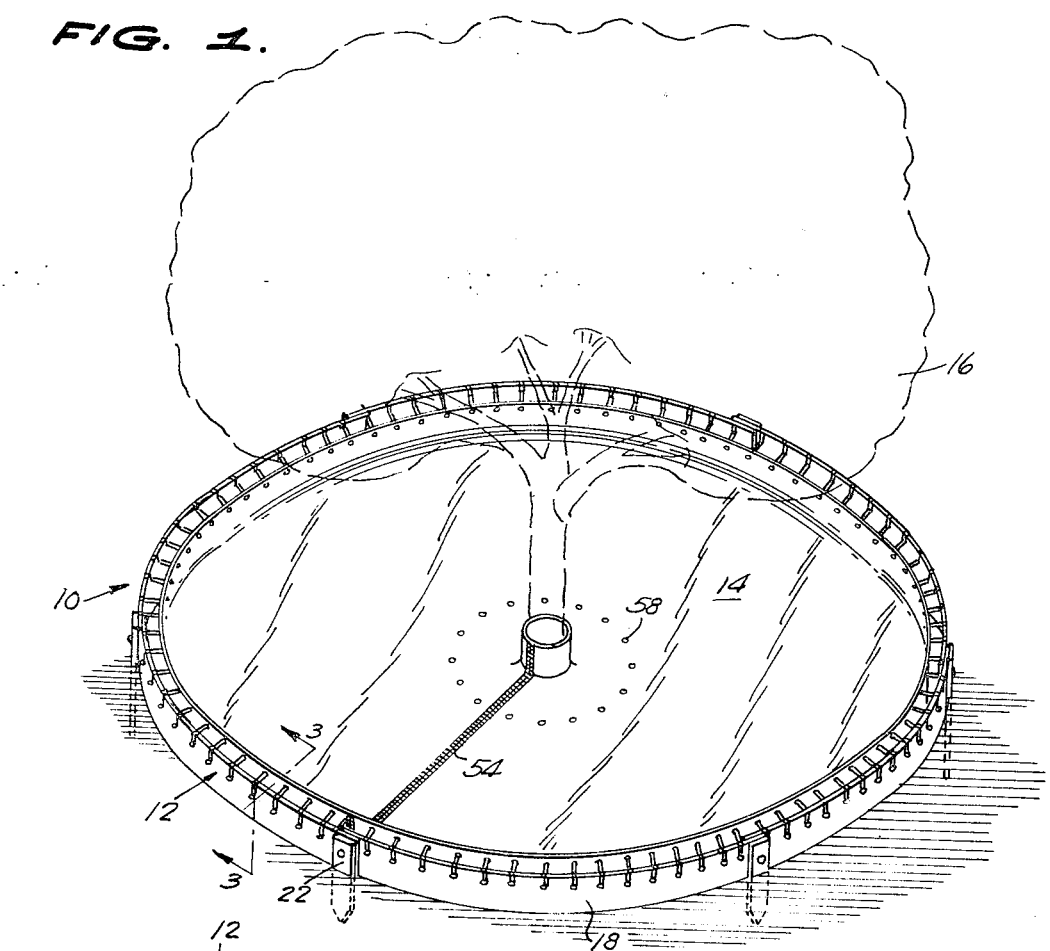
FIGURE 1 is a perspective view of the receptacle comprising the subject of the present invention.

Referring now to the drawings in detail, wherein like numerals indicate like elements throughout the several views, the receptacle of the present invention is generally indicated by the numeral 10.

Receptacle 10 includes a frame 12, for holding a fruit-gathering net 14 of flexible plastic, in surrounding relation to a tree or shrub 16. Frame 12 consists of a circular, upright wall formed from a plurality o farcuate segments 18. Each segment 18 is pivotably connected at at least one of its ends to an adjacent segment, by a rivet 20, as shown in FIGURE 6. Also secured to the segments by rivet 20, at each hinged joint, is a ground-penetrating stake 22.

Figure 2:
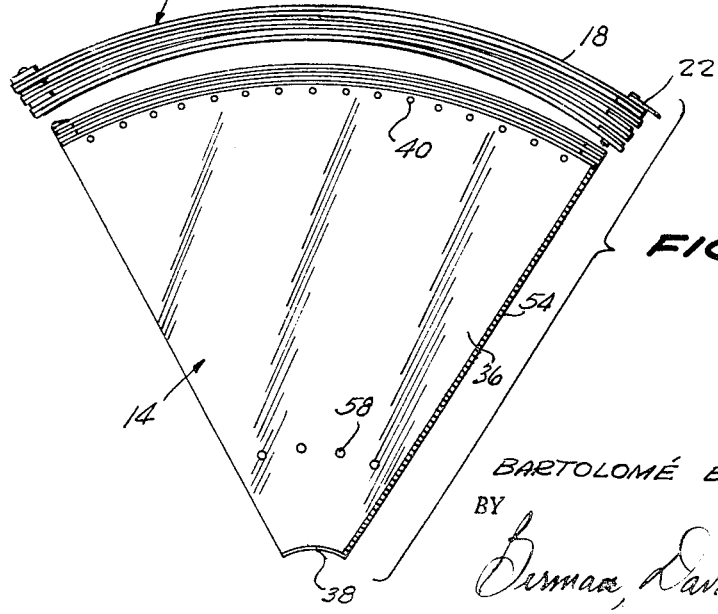
FIGURE 2 is an exploded top plan view of the receptacle shown in FIGURE 1 in folded or stored condition.

As shown in FIGURE 2, by pivoting adjacent segments 18 relative to each other, frame 12 can be collapsed and the segments nested, for storage purposes. To form the segments in a circular array around shrub or tree 16, the procedure is reversed, and can be accomplished in a matter of minutes. With segments 18 opened from their nested condition, stakes 22 are driven into the ground to anchor the frame 12.

Where the terrain surrounding shrub or tree 16 slopes, stake extensions 24, provided with channel-shaped flanges 26 and 28 can be slid and telescoped over the edges of stakes 22, where needed, to level frame 12.

Two of the segments 18, rather than being pivoted together at adjacent ends, are unconnected and free, so that frame 12 can be folded, and also positioned about tree or shrub 16. As shown in FIGURE 7, one of these segments mounts a pivotable latch 30 on its exterior wall, having a hook 32, receivable on a keeper pin 34 on the free end of the adjacent segment 18. The latch and pin lock the frame 12 in its extended position.

Net 14 is also circular, and can be folded into sectors 36 for storage, as shown in FIGURE 2. When unfolded, it is secured to frame 12, and fills the space between the frame and tree or shrub 16 so that the inner arcuate edges 38 of net sectors 36 abut the trunk of tree or shrub 16, as shown in FIGURE 1.

Net 14 can be secured to frame 12 in a simple and expedient manner. The net 14 has a series of openings 40 about its periphery, reinforced with grommets or eyelets 42. Flexible fastening elements, such as cords or ropes 44, are strung through each grommet 42 and knotted at their ends, as shown at 46 and 48.

The segments 18 of frame 12 have vertical slots 50 cut therein, which slots open in the top adge 52 of frame 12. Each cord 44 is disposed in a slot 50, with knots 46 and 48 on the exterior side of the slot. Knots 46 and 48 have a dimension larger than the width of slot 50, so that the cord 44 cannot be pulled through the slot. To remove the net 14 from frame 12, cords 44 are raised upwardly through top edge 52 of frame 12.

As shown in FIGURE 1, when net 14 is fully opened, it fills the interior of frame 12. The ends of two sectors 36 are not integrally joined, but a slit is formed in the net so it can be disposed around shrub or tree 16. The sides of this slit are provided with a zipper 54 for closing net 14 about tree or shrub 16.

As shown in FIGURES 3 and 4, net 14 is hung from frame 12 so that a major portion thereof is coplanar with the bottom edge 56 of the wall of frame 12. This enables the net 14 to be flush with the support surface and permits a fruit picker to stand in receptacle 10 and drop picked fruit about him onto the net. To collect the fruit, net 14 need only be removed from frame 12, as described heretofore. This eliminates the need of the picker to constantly empty and refill individual baskets with the picked fruit.

Net 14 is also provided with water drainage openings 58, so that the net can be left in position even if it should rain.

While a specific embodiment of my invention has been disclosed in the foregoing description, it will be understood that various modifications within the spirit of the invention may occur to those skilled in the art.

I claim:

1. A ground-engaging receptacle for use in gathering harvested fruit or the like comprising: a frame having a substantially upright wall formed of a band of rigid material with its bottom edge being adapted for ground-engaging positioning about a fruit bearing shrub, said wall including a plurality of arcuate segments each having horizontal pivot means connecting adjacent ends of said segments along the periphery of said receptacle whereby said circular wall is readily erectable from a collapsed compact unit and after use is pivotally foldable into a compact unit having a periphery substantially equal to a single segment with the remaining segments being nested in a substantially concentric relationship; a net secured to the top edge of said frame wall substantially filling the interior portion of said frame for catching fruit removed from said shrub, said net having a substantial portion of its bottom surface coplanar with said wall bottom edge when in use thereby enabling a fruit picker to stand thereon.

2. A receptacle in accordance with claim 1 wherein said frame includes a plurality of flattened stakes fixed to said wall pivot means for anchoring it to a support surface.

3. A receptacle in accordance with claim 2 including stake extensions telescopically received by said anchoring stakes whereby said wall may be positioned level on said support surface.

4. A receptacle in accordance with claim 1 wherein said net includes water drainage openings.

5. A receptacle in accordance with claim 1 wherein said wall includes substantially vertical slots in said wall opening in its top edge, and said net includes flexible fastening elements having knotted ends projecting from its periphery and removably received within the openings in said wall.

6. A ground-engaging receptacle for use in gathering harvested fruit or the like comprising: a frame having a substantially upright wall formed of a band of rigid material, said wall including substantially vertical slots opening in its top edge, its bottom edge being adapted for ground-engaging positioning about a fruit bearing shrub; a net secured to the top edge of said frame wall with flexible fastening elements having knotted ends projecting from its periphery and removably received within said slots, said net substantially filling the interior portion of said frame for catching fruit removed from said shrub, said net having a substantial portion of its bottom surface coplanar with said wall bottom edge when in use thereby enabling a fruit picker to stand thereon.

7. A receptacle for use in gathering harvested fruit or the like comprising a frame including a substantially upright circular wall adapted to be positioned about a fruit bearing shrub and anchored to a supporting surface, said frame including arcuate segments each having an end portion pivotably connected to a next adjacent segment in slideable relationship whereby said frame can be collapsed for storage, and a net romovably secured at its periphery to said frame and substantially filling the interior thereof for catching harvested fruit removed from said shrub.

8. A receptacle in accordance with claim 7 wherein said wall includes substantially vertical slots in said wall opening in its top edge, and said net includes flexible fastening elements having knotted ends projecting from its periphery and removably received within the openings in said wall.

9. A receptacle in accordance with claim 8 wherein said wall bottom edge and said net bottom are in ground-engaging position, said wall including means for anchoring said wall to said ground.

10. A receptacle in accordance with claim 9 wherein said net includes a zipper extending radially from the inner periphery of said net to its outer periphery, and at least two arcuate segments having latching means secured thereto for securing said segments in circular position.

11. A receptacle in accordance with claim 9 wherein said anchoring means comprise a plurality of stakes secured to said wall at said segment pivotal connection.

12. A receptacle in accordance with claim 9 wherein said net is made of flexible plastic sheet material and includes water drainage openings therein.

References Cited

UNITED STATES PATENTS

| | | | |
|---|---|---|---|
| 941,039 | 11/1909 | Pierce | 24—128 XR |
| 1,286,947 | 12/1918 | Creed | 56—329 |
| 1,366,563 | 1/1921 | Fleckner | 56—329 |

F. BARRY SHAY, Primary Examiner

J. O. OLIFF, Assistant Examiner